(12) United States Patent
DiSorbo

(10) Patent No.: US 9,708,119 B2
(45) Date of Patent: Jul. 18, 2017

(54) MODULAR SHIPPING APPARATUS AND SYSTEM

(71) Applicant: Cargo Cube Systems, LLC, Margate, FL (US)

(72) Inventor: Aldo DiSorbo, Davie, FL (US)

(73) Assignee: Cargo Cube Systems, LLC

( * ) Notice: Subject to any disclaimer, the term of this patent is extended or adjusted under 35 U.S.C. 154(b) by 0 days.

(21) Appl. No.: 15/251,028

(22) Filed: Aug. 30, 2016

(65) Prior Publication Data

US 2016/0368705 A1  Dec. 22, 2016

Related U.S. Application Data

(63) Continuation-in-part of application No. 14/414,473, filed on Jan. 13, 2015, and a continuation-in-part of application No. 14/361,280, filed on May 28, 2014, and a continuation-in-part of application No. 14/242,998, filed on Apr. 2, 2014.

(60) Provisional application No. 62/241,263, filed on Oct. 14, 2015, provisional application No. 61/927,957, filed on Jan. 15, 2014.

(51) Int. Cl.
| | |
|---|---|
| *B60P 1/36* | (2006.01) |
| *B65D 88/54* | (2006.01) |
| *B65D 88/12* | (2006.01) |
| *B65D 19/00* | (2006.01) |
| *B60P 1/52* | (2006.01) |
| *B60P 1/44* | (2006.01) |

(52) U.S. Cl.
CPC ............. *B65D 88/546* (2013.01); *B60P 1/36* (2013.01); *B60P 1/44* (2013.01); *B60P 1/52* (2013.01); *B65D 19/0004* (2013.01); *B65D 88/12* (2013.01); *B65D 88/542* (2013.01)

(58) Field of Classification Search
CPC .. B65D 88/546; B60P 1/36; B60P 1/44; B60P 1/52
USPC .................................................. 414/556, 557
See application file for complete search history.

(56) References Cited

U.S. PATENT DOCUMENTS

| | | | | |
|---|---|---|---|---|
| 3,779,406 A | * | 12/1973 | Hermann | B60P 1/4414 414/537 |
| 4,273,217 A | * | 6/1981 | Kajita | A61G 3/06 187/200 |
| 4,640,657 A | * | 2/1987 | Moore | B65G 67/02 414/347 |

(Continued)

*Primary Examiner* — Jonathan Snelting
(74) *Attorney, Agent, or Firm* — Jennifer Meredith, Esq.; Meredith & Keyhani, PLLC

(57) ABSTRACT

A modular shipping apparatus comprising: a shipping container having a first track and a second track attached to the bottom interior; a base having a bottom portion with wheel assemblies that slide along the first and second track; a liftgate having a first liftgate track and a second liftgate track, wherein the first liftgate track and a second liftgate track are aligned with the first track and the second track attached to the bottom interior and is pivotally attached to the bottom interior of the shipping container, a first and second guide rail which extend a portion of the length of the sides and having a first and second removable wing portion removably attached to provide a removed position and a working position, wherein the working position of the first and second removable wing portions extends to at least the left side and right side, respectively, of the liftgate.

22 Claims, 24 Drawing Sheets

DETAIL A

(56) References Cited

U.S. PATENT DOCUMENTS

| | | | | |
|---|---|---|---|---|
| 5,054,295 A | * | 10/1991 | Goulooze | B60P 3/205 296/24.35 |
| 9,056,577 B2 | * | 6/2015 | Corrigan | B60P 1/38 |
| 2005/0226706 A1 | * | 10/2005 | Thomas | B60P 1/38 414/467 |
| 2012/0177467 A1 | * | 7/2012 | Corrigan | B60P 1/52 414/352 |

\* cited by examiner

MODULAR SHIPPING APPARATUS AND SYSTEM

FIELD OF THE INVENTION

The present invention relates generally to the field of transportation, storage, and shipping. The present invention is a system to transport, consolidate and store all types of cargo. The system is designed to the reduce cost of transportation and labor. It is also designed to ensure the ease and safety of inputting and removing cargo for worldwide transportation.

BACKGROUND

In the shipping industry, it is desirable to utilize all of the space available. The simple stacking of a plurality of boxes having variable shapes often results in wasted space in a storage compartment. Unused space in a storage compartment also increases the likelihood that objects stored there will shift during transport, suffering damage or fracture.

Shipping is common, as are large-scale shipping vessels. However, much ground transportation is not efficiently conducted. In addition, trailers used for shipping may elevate several feet off the ground. Operating one of these trailers requires the use of ramps or the lifting by human operators in an effort to place objects in one of said trailers. Trailer lifts have also been developed to assist in this operation.

Once objects are placed inside a trailer it is often challenging to stack and arrange said objects in an alignment in which they can be transported in an efficient manner utilizing all available space, and in such a way so as to prevent shifting or damage during transport.

Distribution centers, where cargo is redistributed among trailers and forklifts, are commonly used. However, it is difficult to operate a forklift inside a trailer. In addition, a pallet generally used with standard forklifts does not have the same dimensions as that of a trailer. Thus, using forklifts may require less manual labor, but does not improve the ability to maximize the use of storage space.

It is therefore desirable to provide a means to efficiently maximize the amount of space used inside a storage or transportation container.

It is also desirable to provide a means for efficiently and easily arranging transported objects inside a trailer or other compartment.

It is also desirable to provide a system that may be utilized in conjunction with a rail system, which is more cost effective.

BRIEF SUMMARY OF THE INVENTION

Accordingly, objects of the present invention are to provide modular shipping systems, apparatuses and methods for improving efficient use of space in storage compartments in the transport and shipping industries.

According to one aspect of the present invention, a modular shipping apparatus for a transportation container is provided with a shipping container (5304) with a bottom interior (5305) and having a first track (5300) and a second track (5302) attached to the bottom interior; a base (5306) having a bottom portion with at least two wheel assemblies, wherein one of each of the at least two wheel assemblies slide along the first track (5300) and the second track (5302); a liftgate (5308) having a top portion (5310), bottom portion (5311), left side (5312), right side (5314), top side (5316) and bottom side, wherein the top side (5316) has a first liftgate track (5324) and a second liftgate track (5326), wherein the first liftgate track (5324) and a second liftgate track (5326) are aligned with the first track (5300) and the second track (5302) attached to the bottom interior and the top portion (5310) is pivotally attached (5318) to the bottom interior (5305) of the shipping container, wherein the top side (5316) has a first guide rail (5332) and a second guide rail (5330), the first guide rail extends a portion of the length of the left side and having a first removable wing portion (5320) removably attached to provide a removed position and a working position and the second guide rail (5330) extends a portion of the length of the right side and having a second removable wing portion (5322) removably attached to provide a removed position and a working position, wherein the working position of the first removable wing portion (5320) extends to at least the left side (5312) of the liftgate, wherein the working position of the second removable wing portion (5322) extends to at least the right side (5314) of the liftgate.

These and other objects and advantages of the present invention will become apparent from a reading of the attached specification and appended claims. There has thus been outlined, rather broadly, the more salient features of the invention in order to better appreciate the contribution of the instant invention to the art. There are features of the instant invention that will be described hereinafter and which will form the subject matter of the claims appended hereto.

DETAILED DESCRIPTION

The claimed invention is designed to use every available square inch of a vehicle. A vehicle may include a truck, trailer, international container, rail car, overseas container, or other transportation vehicle. A transportation box is also referred to as a Cargo Container or Cargo Cube. The claimed invention may enable a buffer space of 1 inch on each side plus 1 inch on the top and 1 inch on the bottom for the transportation modular components to fit. This arrangement increases efficiency and enables a user to use every square inch of the vehicle.

Figure 1:
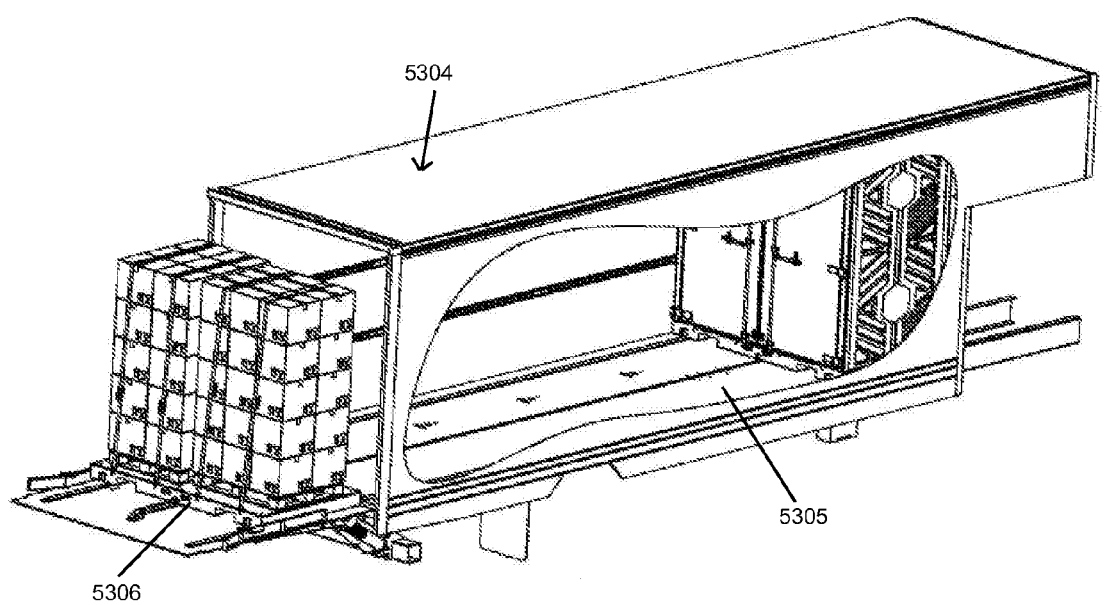
FIG. 1 is a picture of a shipping container.
Figure 2:
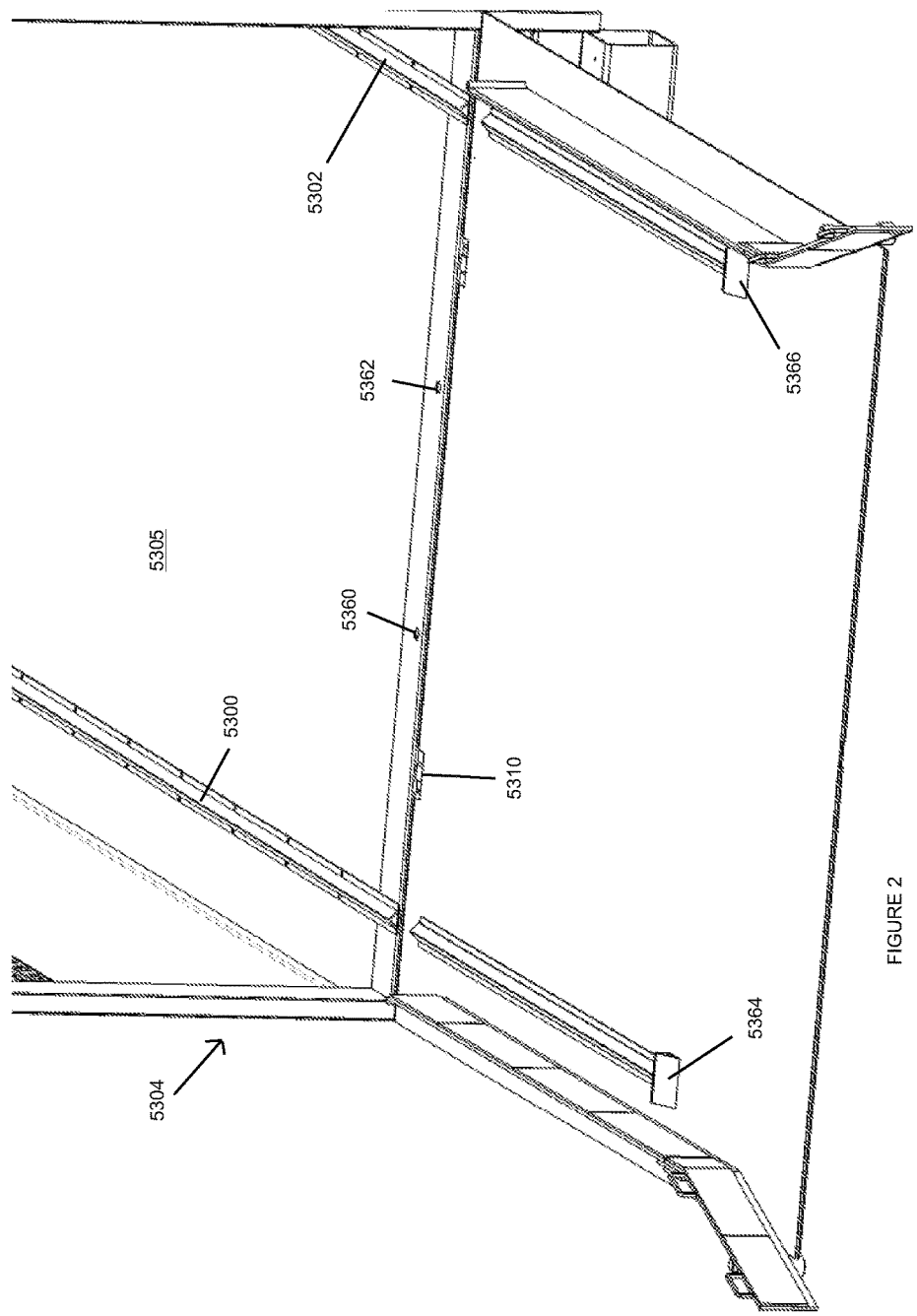
FIG. 2 is a picture of a liftgate and a portion of the shipping container.
Figure 3:
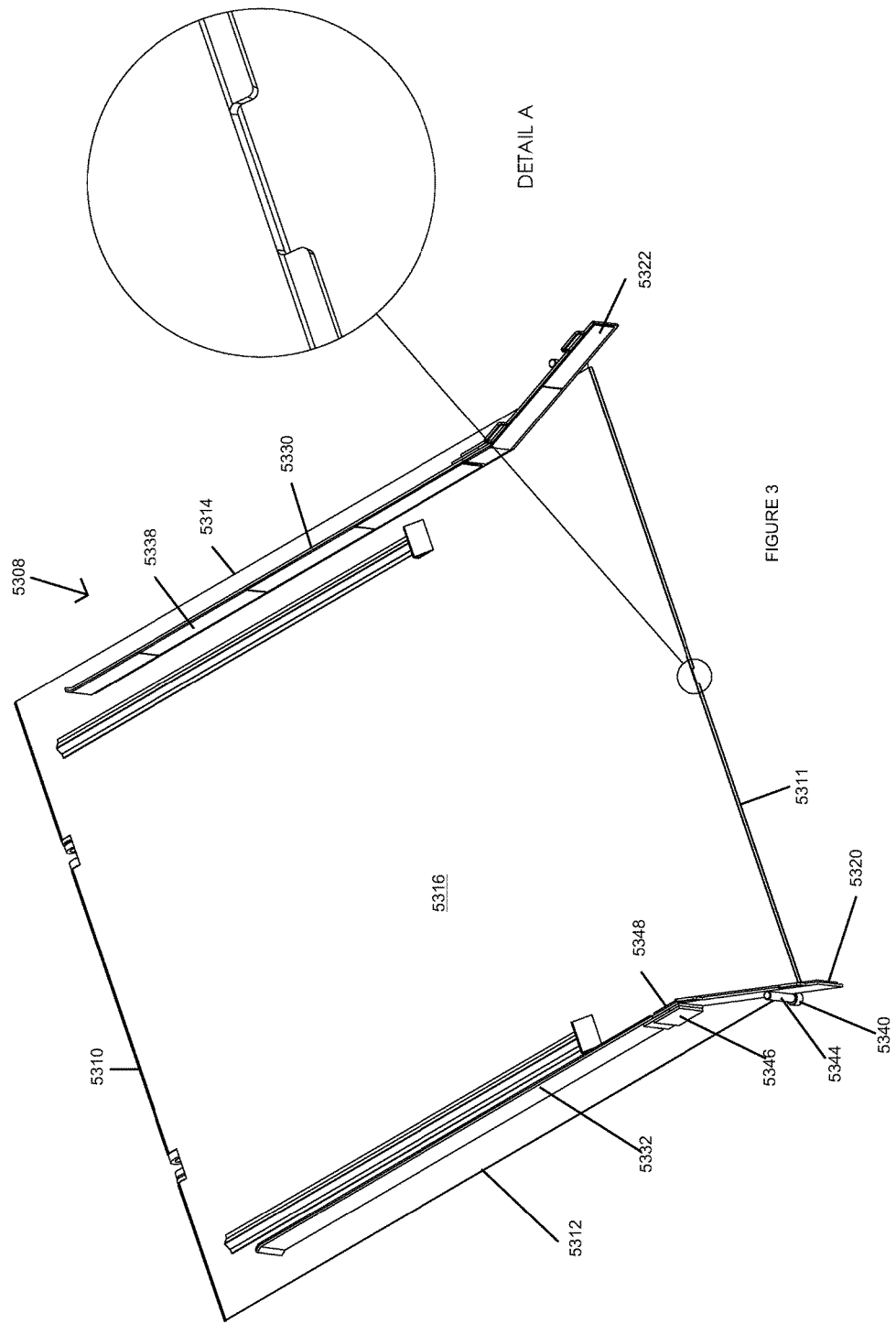
FIG. 3 is a picture of the liftgate.
Figure 4:
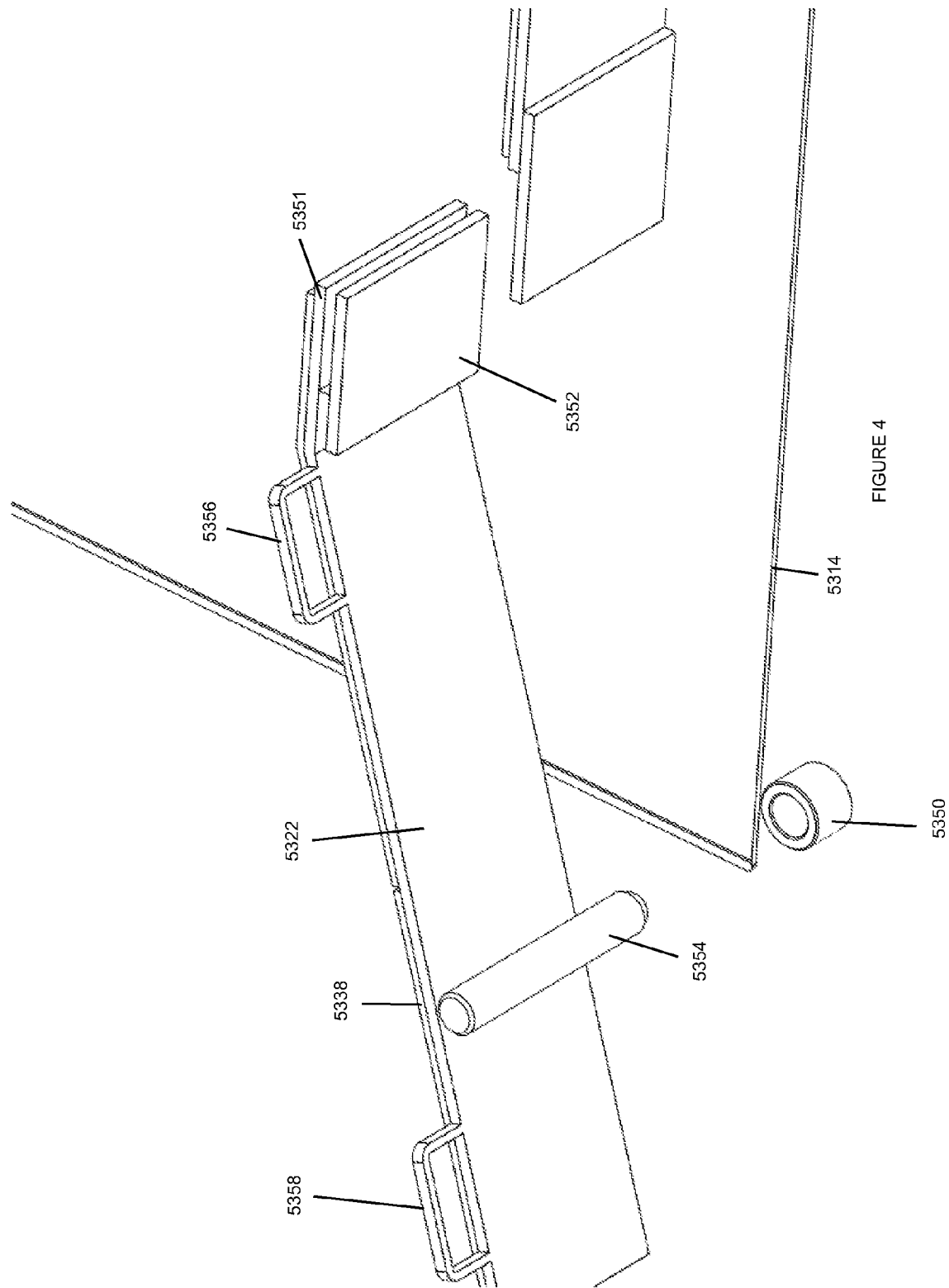
FIG. 4 is a picture of the second removable wing portion.
Figure 5:
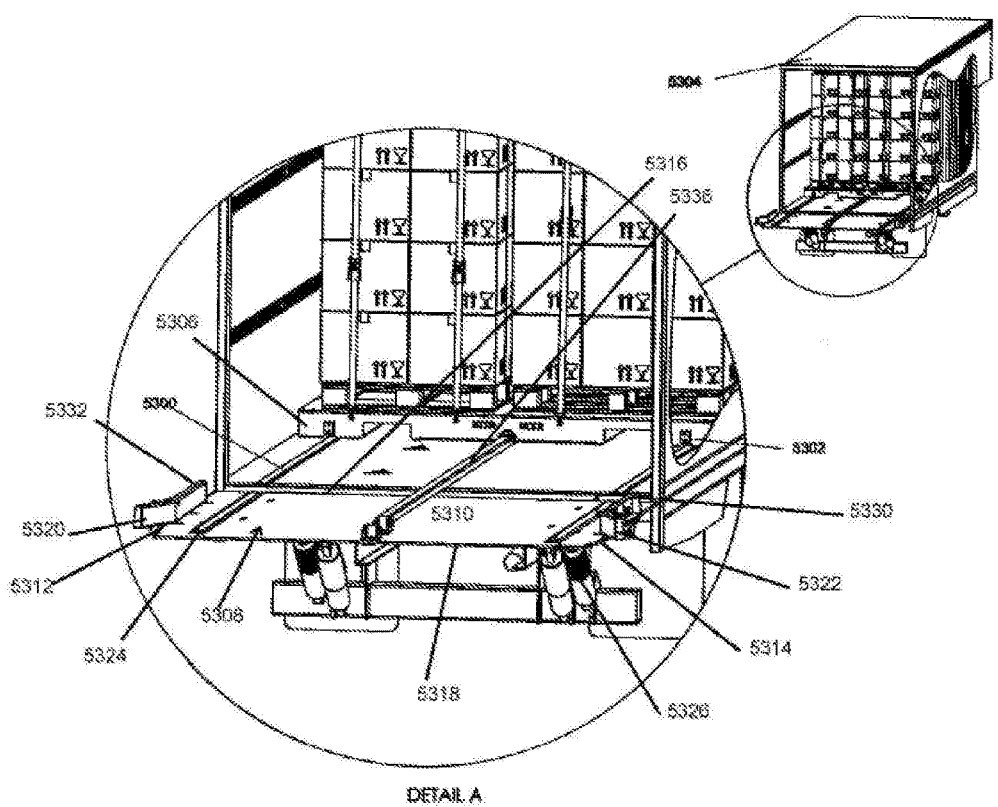
FIG. 5 is a picture of a cargo container mounted on a base in the shipping container and the liftgate.
Figure 6:
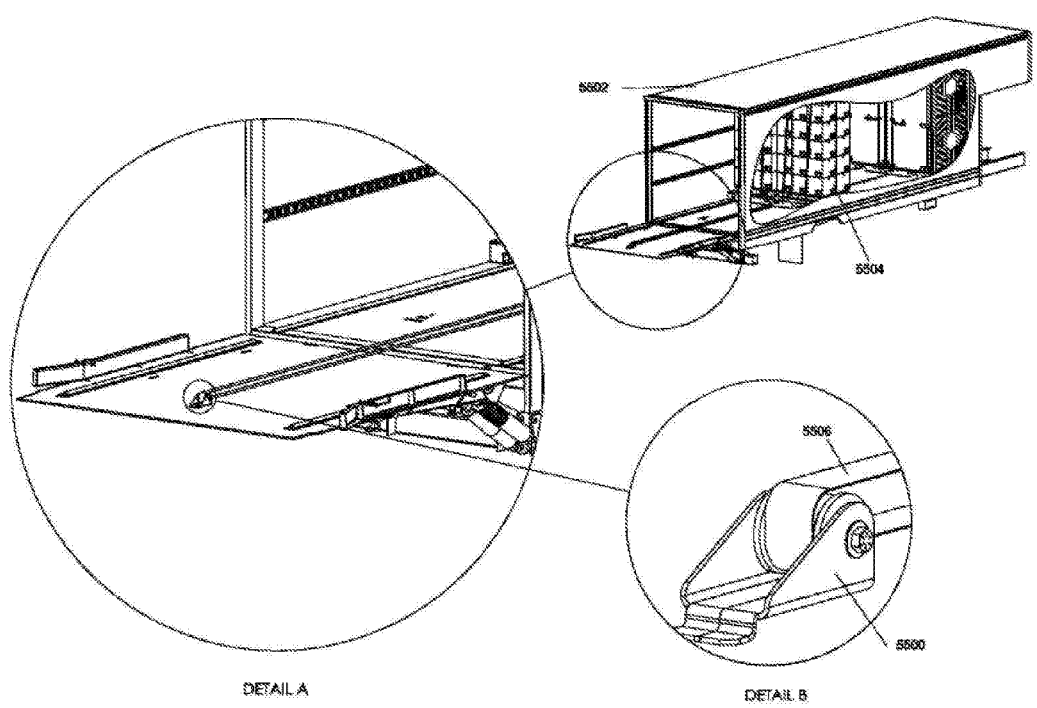
FIGS. 6, 7 and 8 depict the pulley system assembly.
Figure 7:
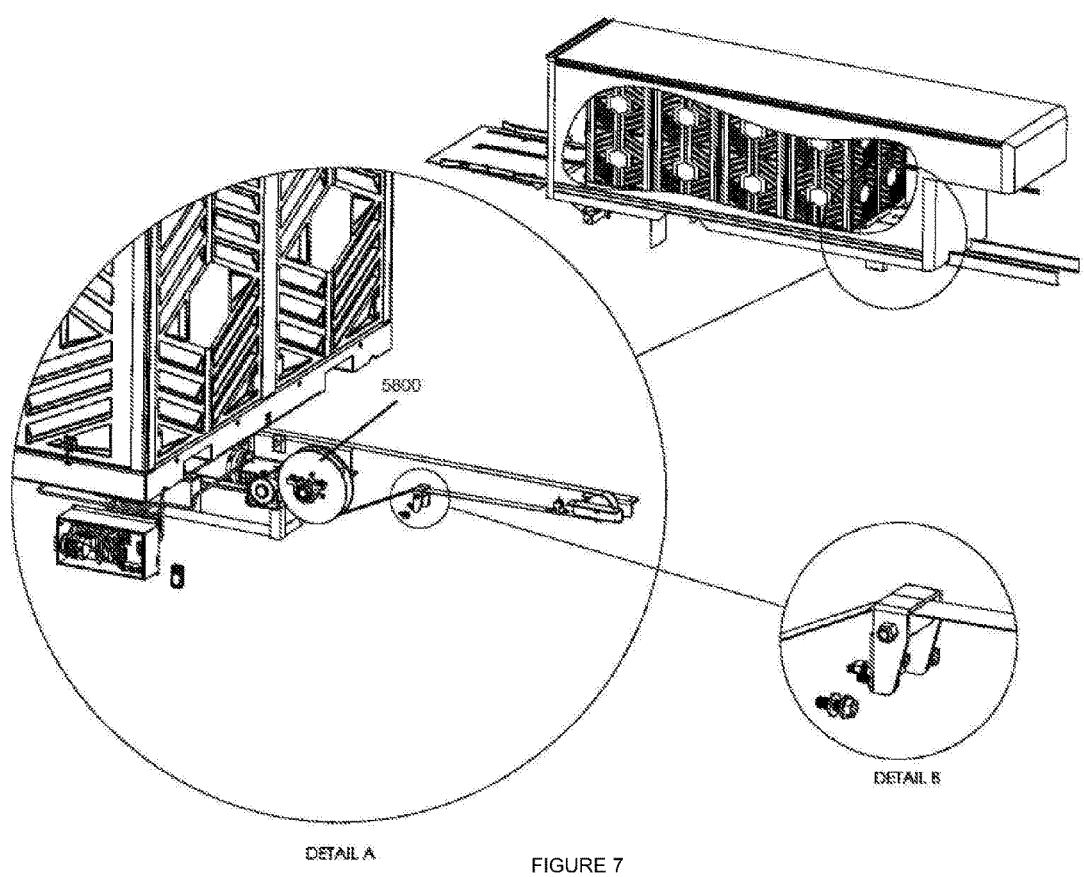
Figure 8:
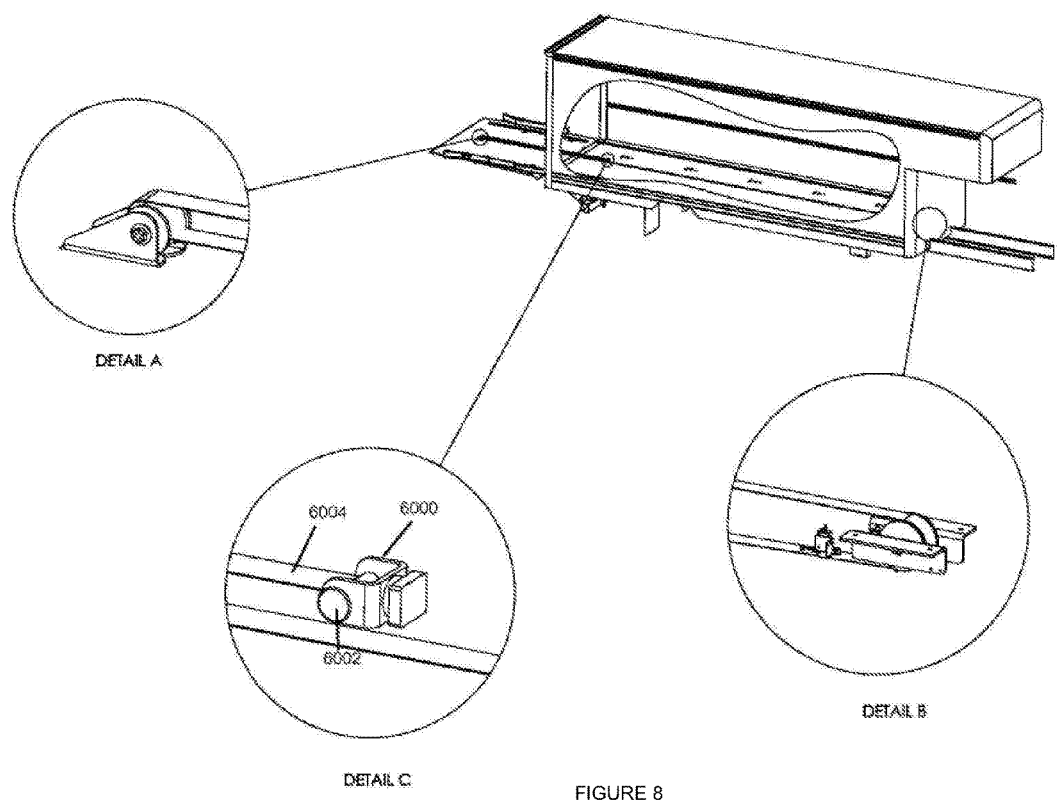
Figure 18:
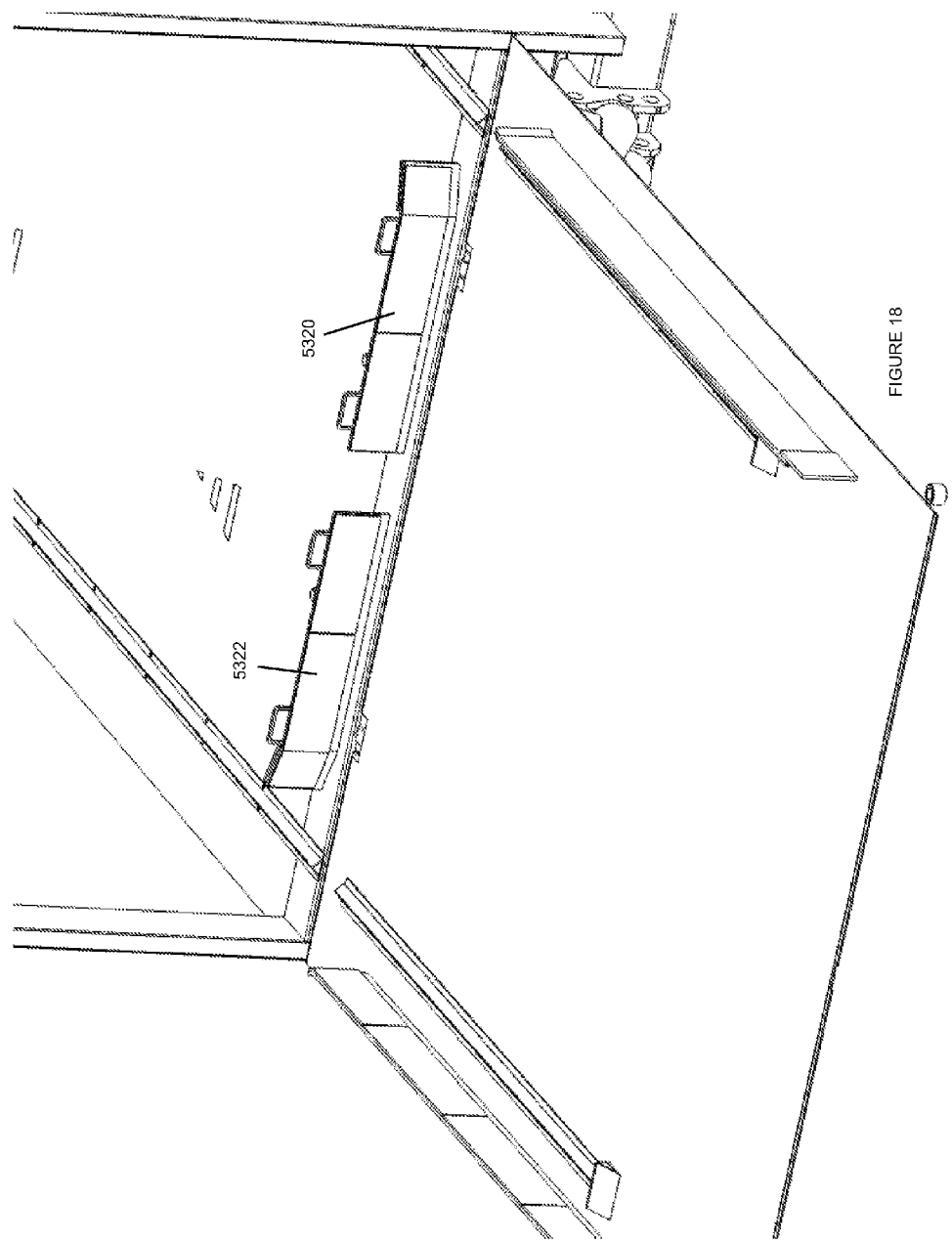
FIG. 18 depicts the liftgate and the shipping container.
Figure 19:
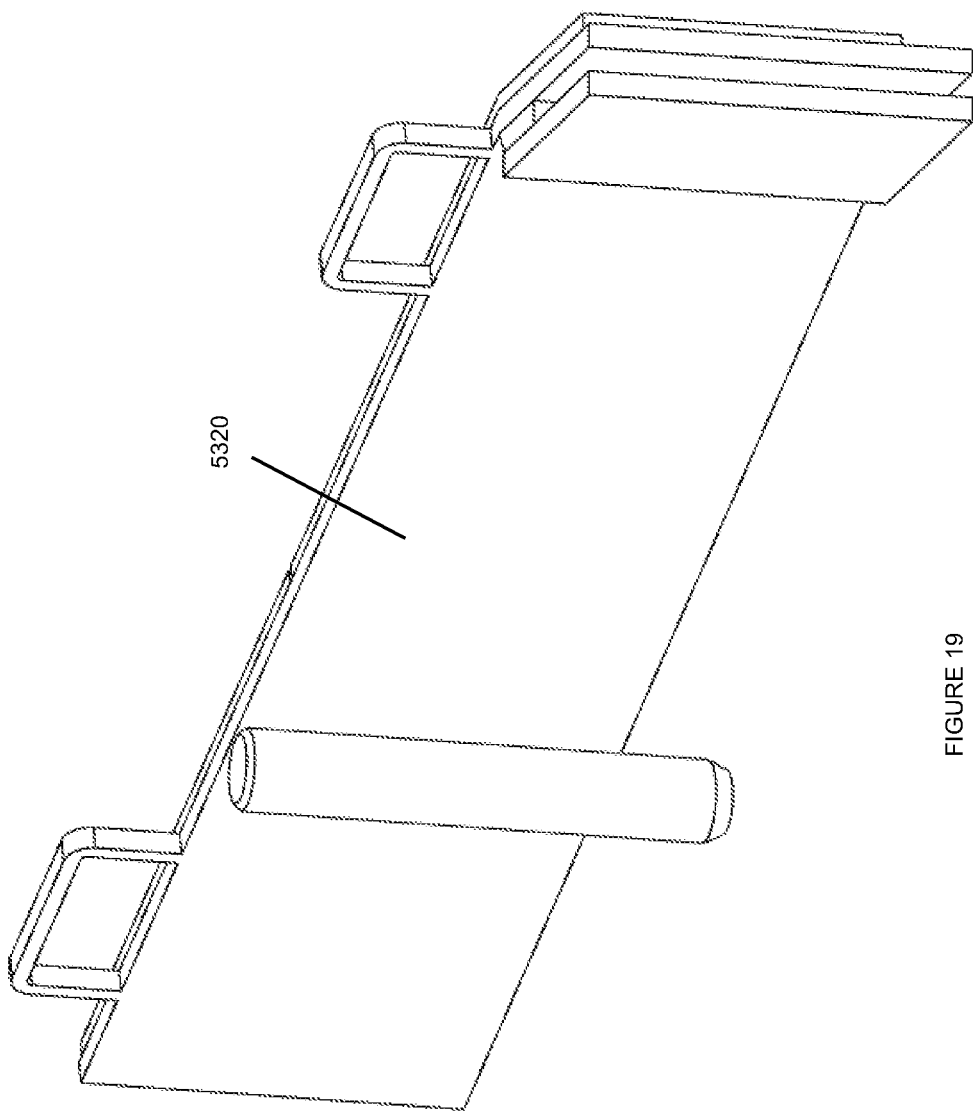
FIG. 19 depicts the first removable wing portion (5320).
Figure 20:
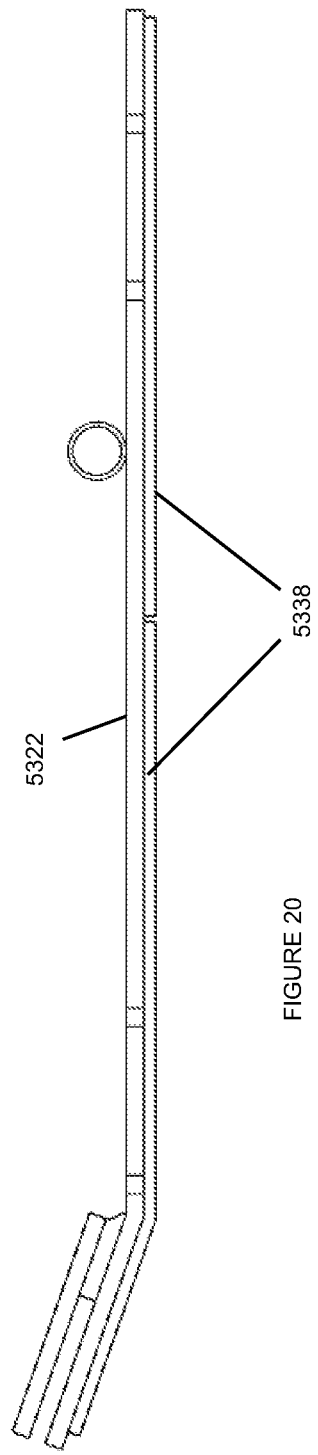
FIG. 20 depicts the second removable wing portion (5322).
Figure 21:
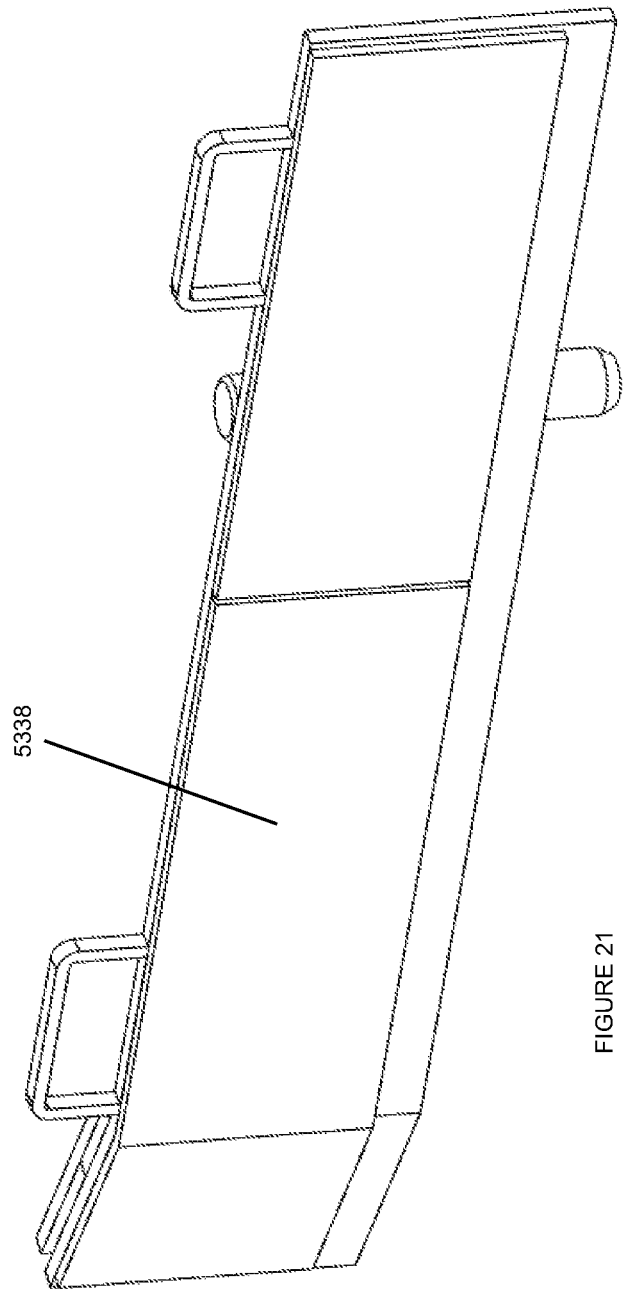
FIG. 21 depicts at least one friction pad (5338).
Figure 22:
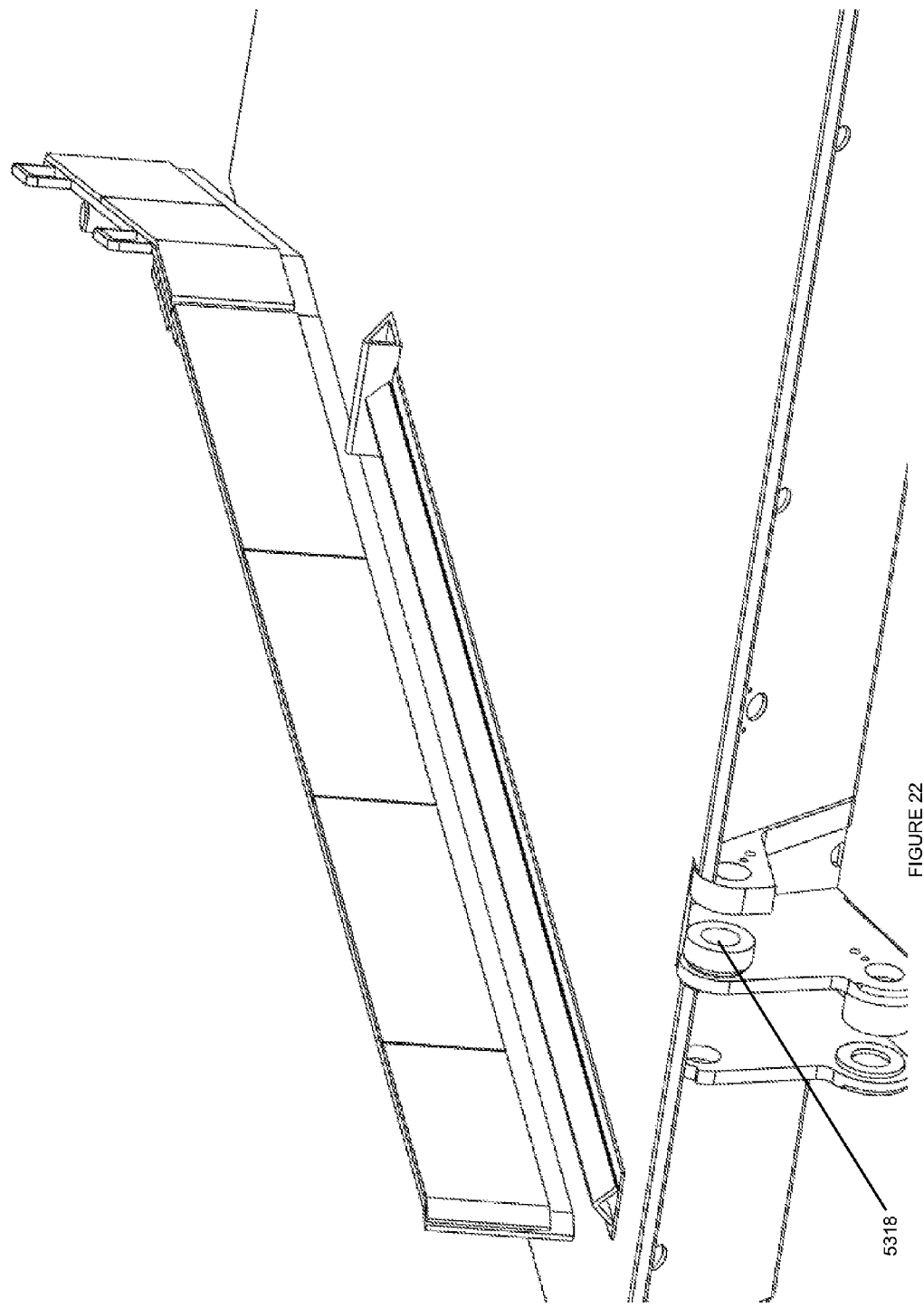
FIGS. 22 depicts a liftgate and a portion of the shipping container.
Figure 23:
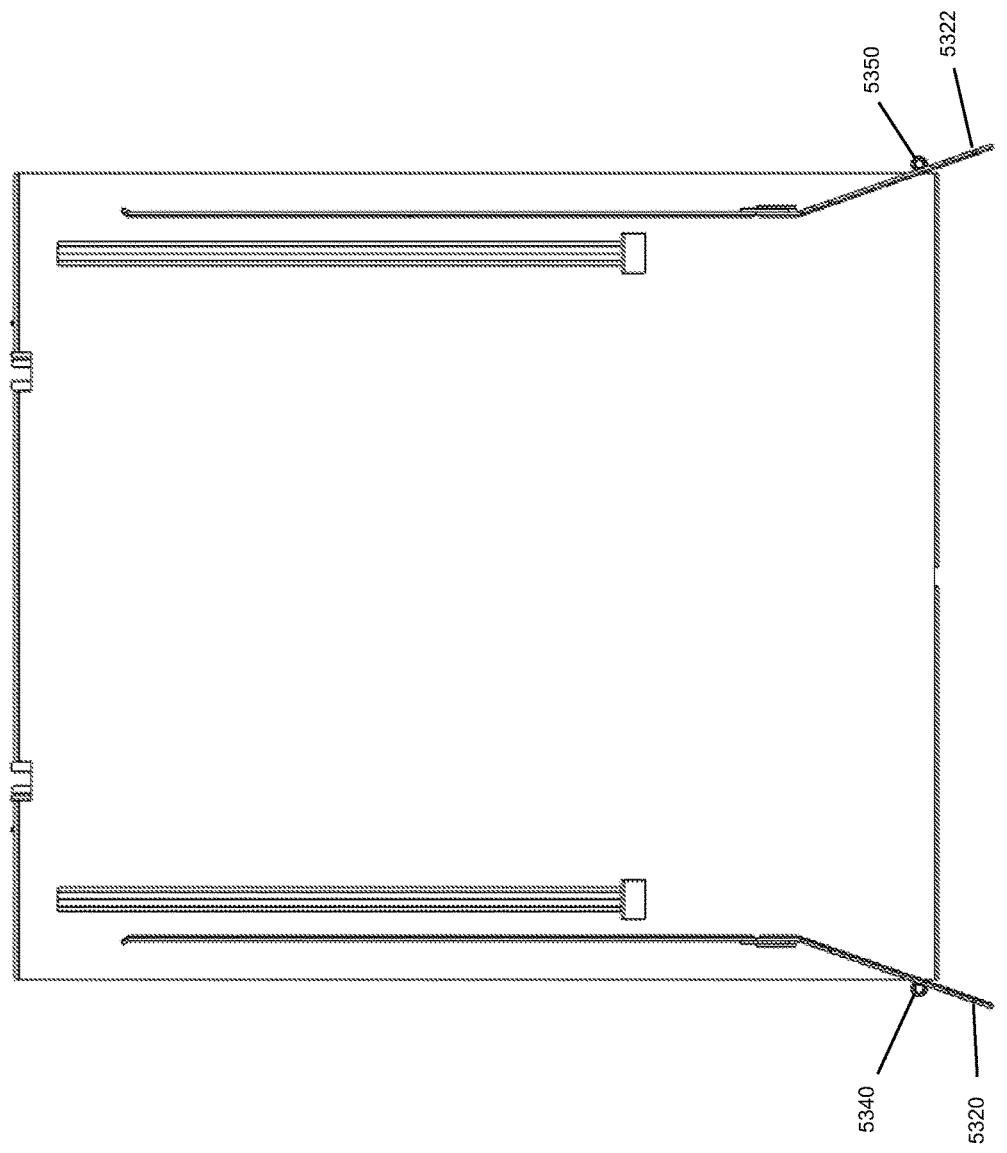
FIG. 23 depicts a top view of the liftgate.
Figure 24:
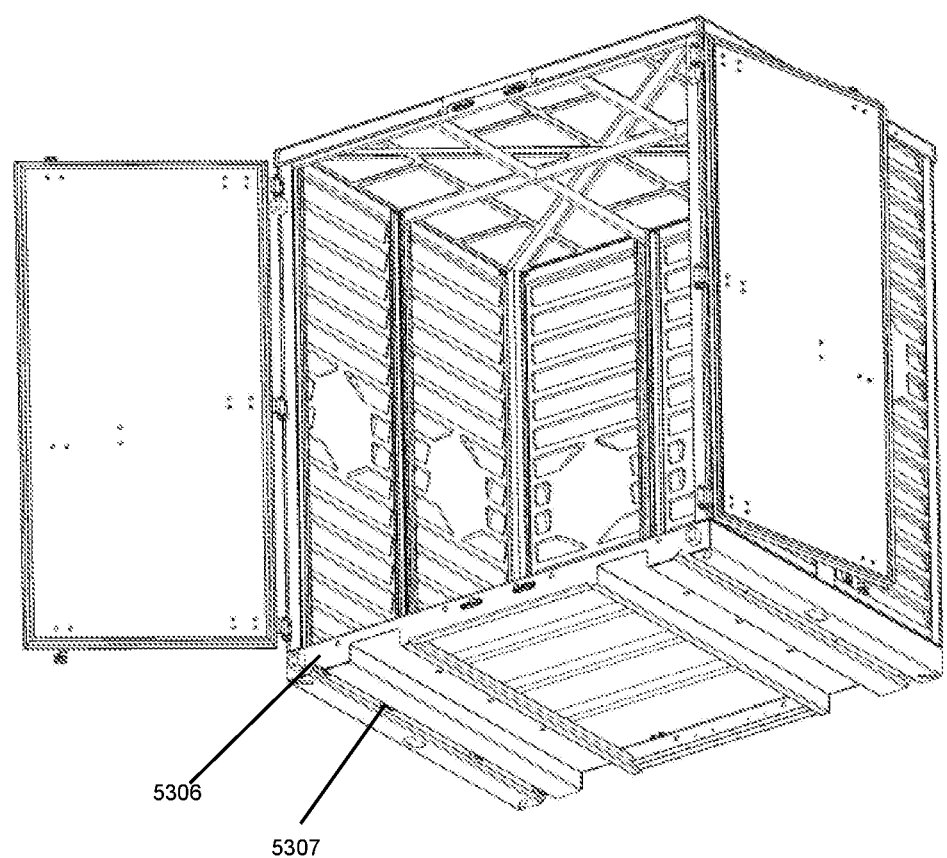
FIG. 24 depicts a bottom view of a base with wheel assemblies.

With reference to FIGS. 1-23, a modular shipping apparatus is provided, comprising: a shipping container (5304) with a bottom interior (5305) and having a first track (5300) and a second track (5302) attached to the bottom interior; a base (5306) having a bottom portion with at least two wheel assemblies (5307), wherein one of each of the at least two wheel assemblies slide along the first track (5300) and the second track (5302); a liftgate (5308) having a top portion (5310), bottom portion (5311), left side (5312), right side (5314), top side (5316) and bottom side, wherein the top side (5316) has a first liftgate track (5324) and a second liftgate track (5326), wherein the first liftgate track (5324) and a second liftgate track (5326) are aligned with the first track (5300) and the second track (5302) attached to the bottom interior and the top portion (5310) is pivotally attached (5318) to the bottom interior (5305) of the shipping container, wherein the top side (5316) has a first guide rail (5332) and a second guide rail (5330), the first guide rail extends a portion of the length of the left side and having a first removable wing portion (5320) removably attached to provide a removed position and a working position and the second guide rail (5330) extends a portion of the length of the right side and having a second removable wing portion (5322) removably attached to provide a removed position and a working position, wherein the working position of the first removable wing portion (5320) extends to at least the left side (5312) of the liftgate, wherein the working position of the second removable wing portion (5322) extends to at least the right side (5314) of the liftgate. FIG. 3 depicts the first removable wing portion (5320) and the second removable wing portion (5322) both removably attached to provide a working position. FIG. 18 depicts the second removable wing portion (5322) in the removed position with respect to being unattached to the second guide rail. FIG. 18 also depicts the bottom interior (5305) of the shipping container (5304) to receiving the first removable wing portion (5320) and the second removable wing portion (5322) in a storage position, such that the first removable wing portion (5320) is substantially perpendicular to the first track (5300) of the shipping container (5304) and the second removable wing portion (5322) is in a storage position substantially perpendicular to the second track (5302) of the shipping container (5304). As can be seen, the first removable wing portion (5320) and the second removable wing portion (5322) in the storage position allows for the liftgate to be folded away. Also, the first removable wing portion (5320) and the second removable wing portion (5322) act as a barrier to prevent the base (5306) from sliding out of the shipping container.

The liftgate may have a first receiving circular portion (5340) along the left side (5312), wherein the first removable wing portion (5320) has an inner parallel plate (5348) and an outer parallel plate (5346) at a first end and a first circular peg (5344) along an outer side and the first circular peg (5344) may be received in the first receiving circular portion (5340) along the left side (5312). The first removable wing portion (5320) may have two open rectangular shaped holds. These allow for easy grasping and removal and attachments of the removable wing portions. The first guide rail (5332) has a rectangular piece along an outer side of the first guide rail (5332) towards the bottom portion (5311) of the liftgate (5308), to provide the inner parallel plate (5348) to align with the first guide rail (5332). The liftgate may have a second receiving circular portion (5350) along the right side (5314), wherein the second removable wing portion (5322) has an inner parallel plate (5351) and an outer parallel plate (5352) at a first end and a second circular peg (5354) along an outer side and the second circular peg (5354) is received in the second receiving circular portion (5350) along the right side (5314). The first guide rail (5332) and the second guide rail (5330) assists the base (5306) having a bottom portion with at least two wheel assemblies (5307) to align with the first liftgate track (5324) and the second liftgate track (5326) on the platform during loading. The second removable wing portion (5322) may have two open rectangular shaped holds (5356 and 5358). The second guide rail (5330) may have a rectangular piece along an outer side of the second guide rail (5330) towards the bottom portion (5311) of the liftgate (5308), to provide the inner parallel plate (5351) to align with the second guide rail (5330). There may be a third receiving circular portion (5360) in the bottom interior (5305) of the shipping container (5304) to receive the first circular peg (5344) in a storage position that the first removable wing portion (5320) is substantially perpendicular to the first track (5300) of the shipping container (5304). There may also be a fourth receiving circular portion (5362) in the bottom interior (5305) of the shipping container (5304) to receive the second circular peg (5354) in a storage position that the second removable wing portion (5322) is substantially perpendicular to the second track (5302) of the shipping container (5304). There may be a first stopper (5364) attached to first liftgate track (5324) and a second stopper (5366) attached to the second liftgate track (5326). The stoppers prevent the base (5306) with the cargo on it, from sliding backwards, preventing injury. There may also be at least one friction pad (5338) attached to the first guide rail (5332) and the second guide rail (5330). The friction pads allow for easy sliding of the base and the cargo attached thereto. The friction pads may be made of a nylon and/or Delrin® material. DuPont™ Delrin® acetal homopolymer resin is a highly-crystalline engineering thermoplastic that industry leaders specify for high load mechanical applications, such as gears, safety restraints, door systems, conveyor belts, healthcare delivery devices and components across a diverse range of products and industries. There may also be a substantially open rectangular portion (700) along the bottom portion (5311) of the liftgate (5308). The substantially open rectangular portion (700) has four rounded corners (e.g. 704 and 706). The substantially open rectangular portion (700) may receive a portion of the pulley system assembly. The notch (substantially open rectangular portion (700)) is there to keep the roller in place and not allow it to shift right or left. If it was to shift, the strap would not be centered causing the strap to roll off the roller.

The at least two wheel assembles may be V-groove wheel assemblies and each of the tracks (first track (5300), second track (5302) first liftgate track (5324) and a second liftgate track (5326)) may be V-shaped tracks. This may be seen in FIG. 2, the tracks are shaped like an upside down V, which is to say they rise to a point in the middle.

There may also be pulley system assembly (5336) attached to the bottom interior of the shipping container and the top side of the liftgate to drag the base along the first track (5300) and the second track (5302) attached to the bottom interior of the shipping container. The pulley system assembly may be comprised of a wheel end (5800) installed along an underside of the shipping container, a pulley end (5500) that is attached to the top side of the lift gate, a strap (5506) that is wrapped around the wheel end (5800) and the pulley end (5500) and attached to a portion of the base to drag the base along the tracks of the shipping container. There may also be at least one bracket (6000) with a pin (6002) attached to a portion of the shipping container, wherein the strap (6004) is threaded through the bracket with a pin.

Figure 9:
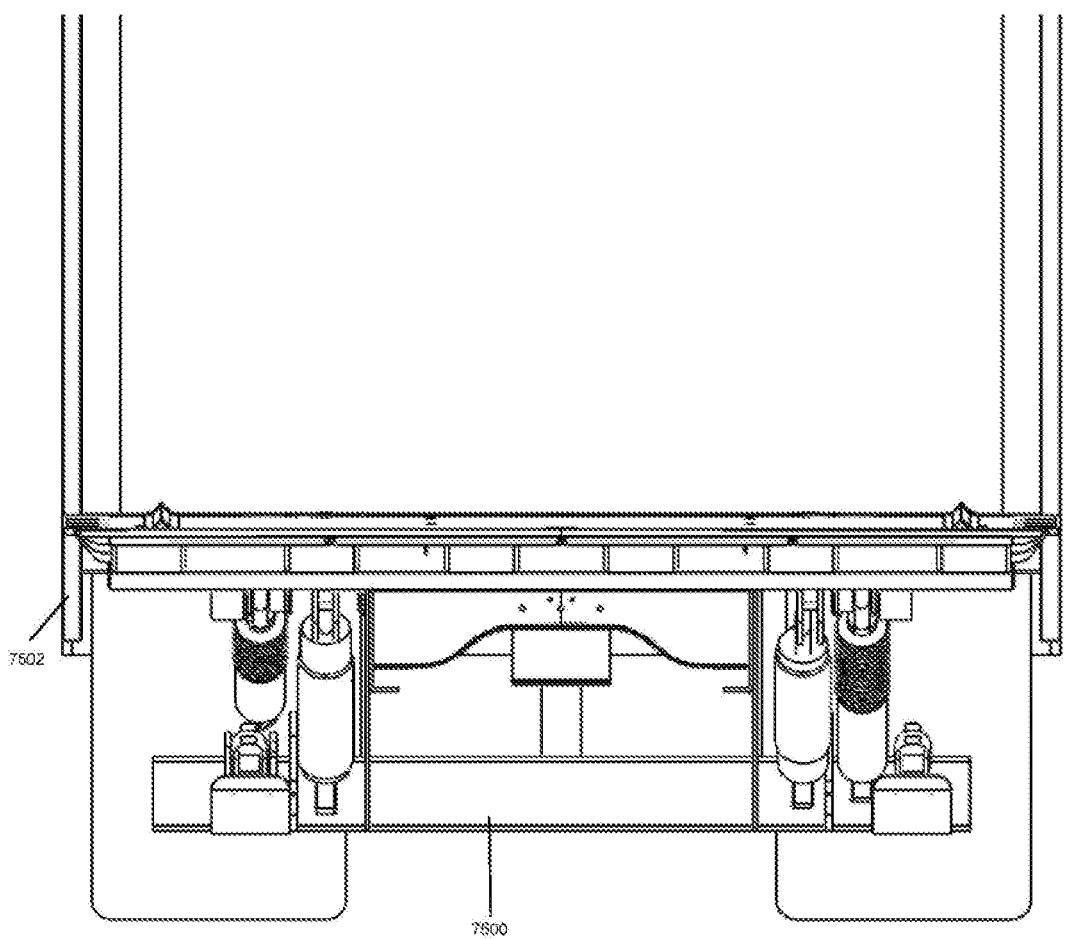
FIGS. 9, 10 and 11 depict the stabilizer.
Figure 10:
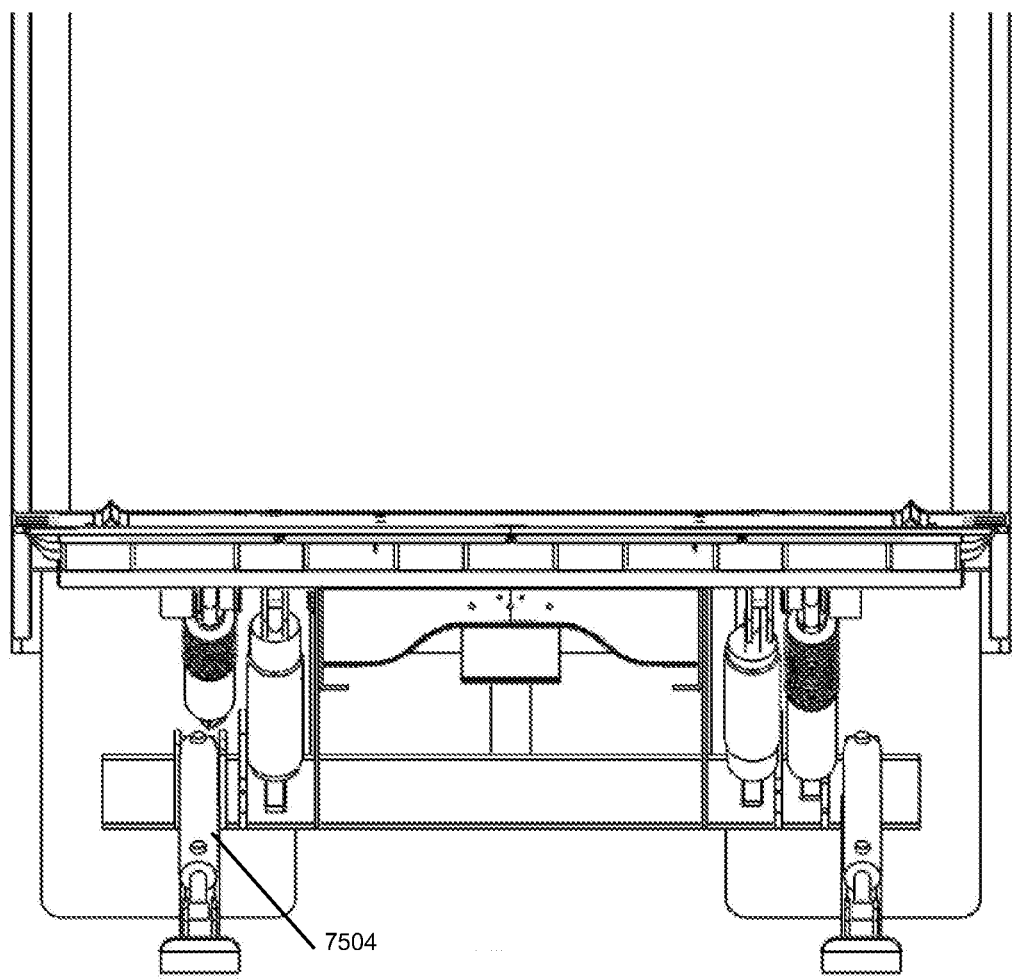
Figure 11:
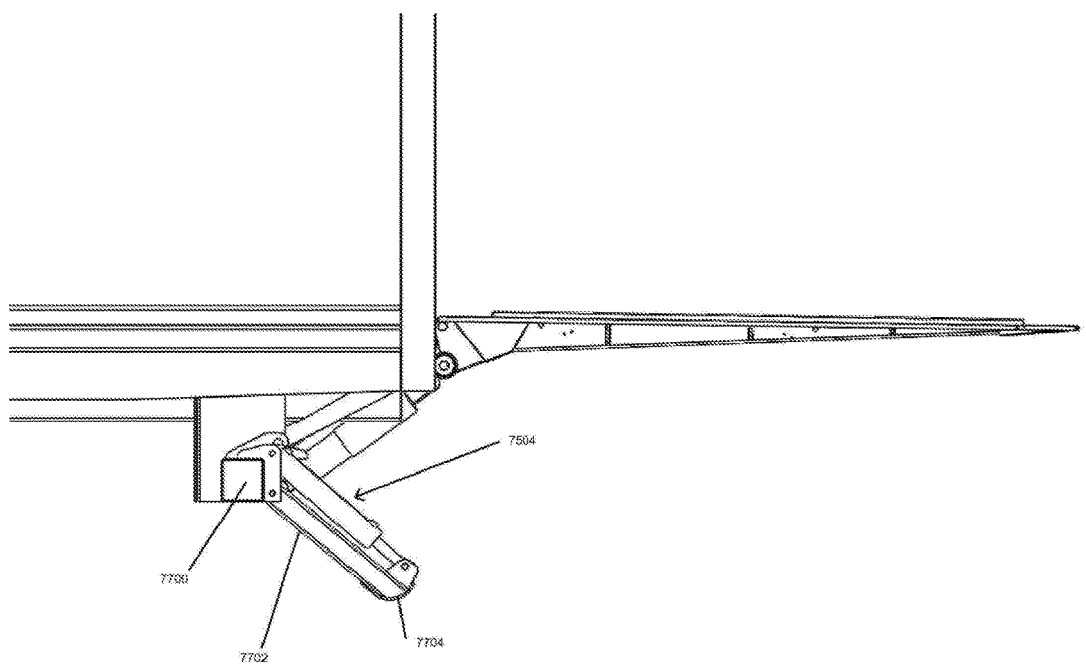
Figure 12:
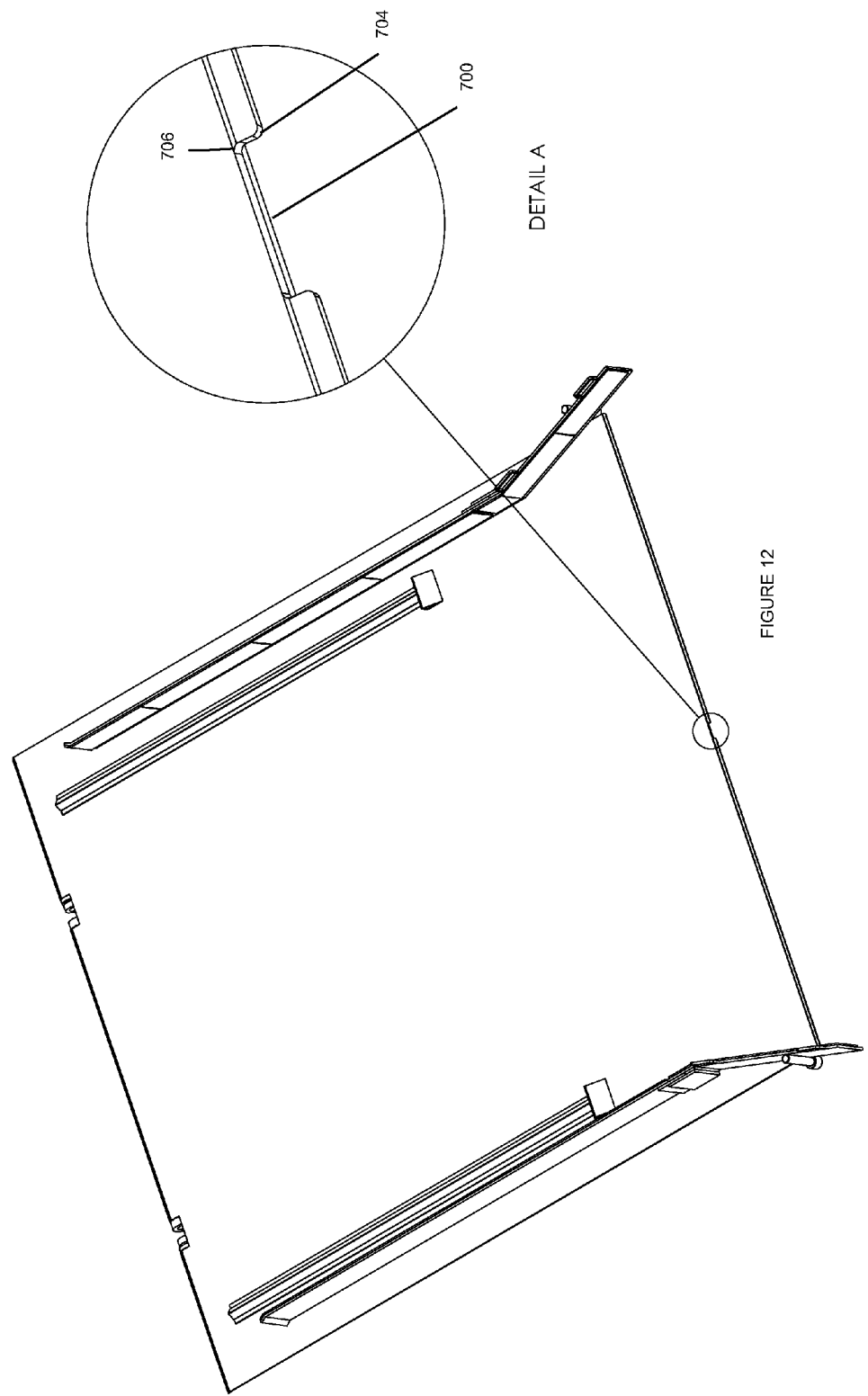
FIG. 12 depicts the liftgate.
Figure 13:
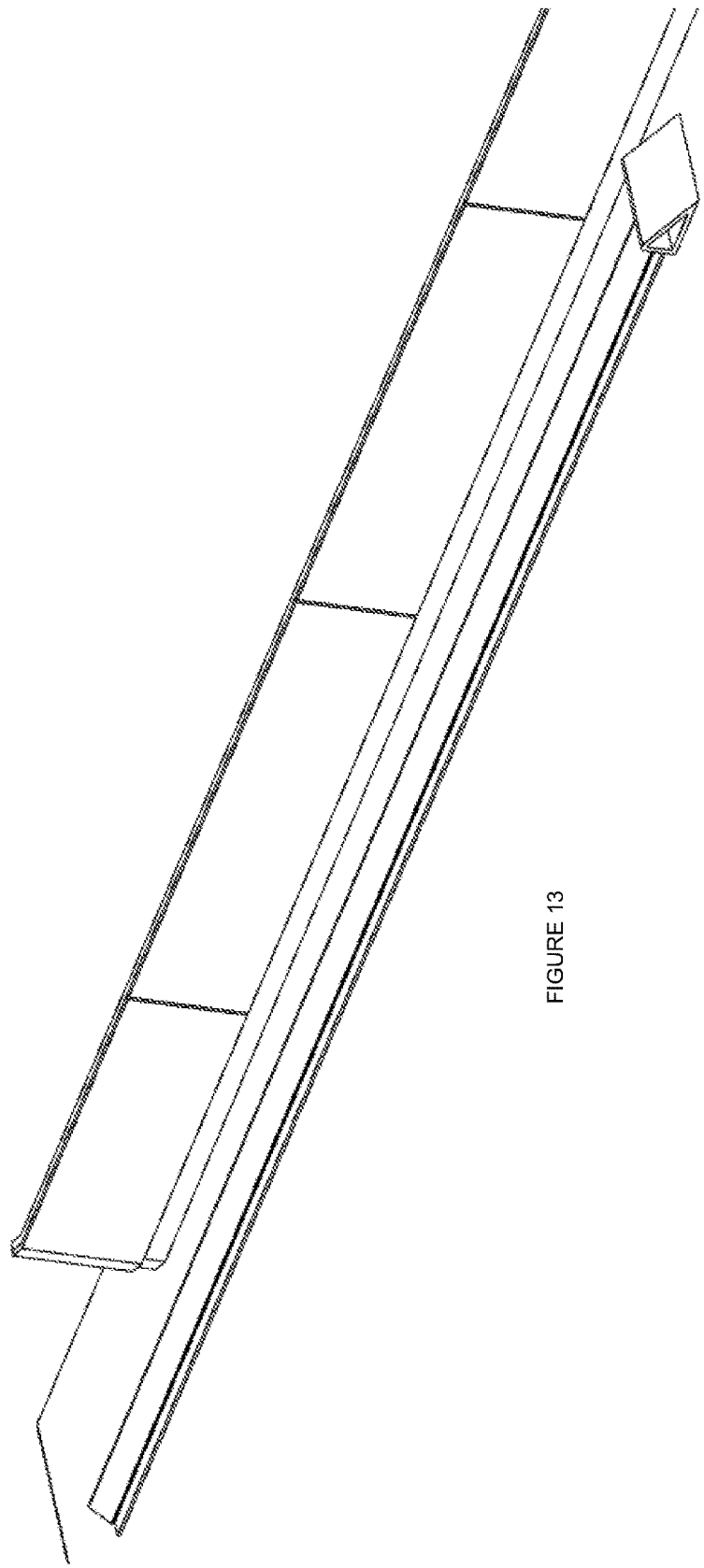
FIG. 13 depicts a stopper and a second guide rail.
Figure 14:
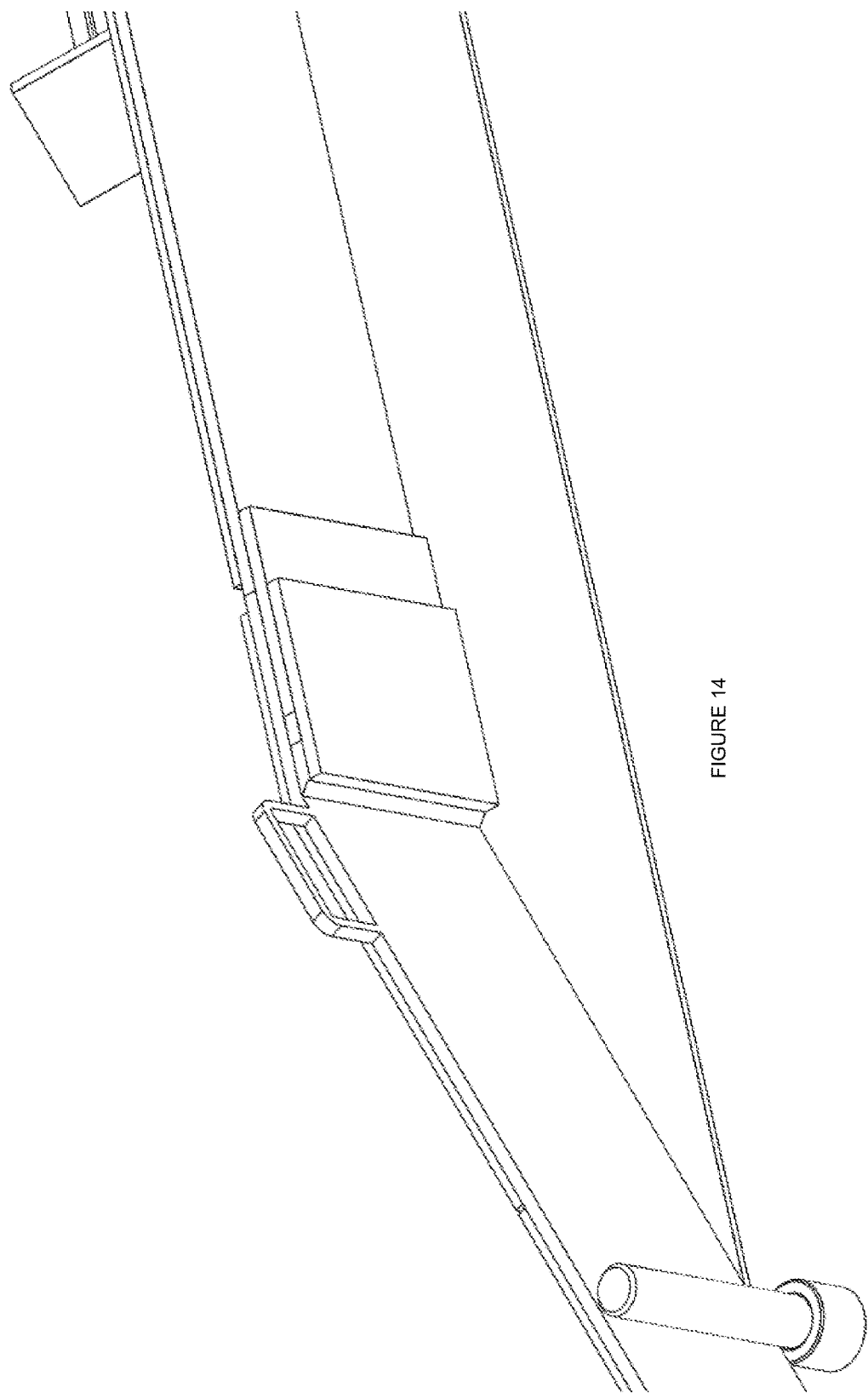
FIGS. 14 and 15 depict the working position of the second removable wing portion (5322) which extends to at least the right side (5314) of the liftgate.
Figure 15:
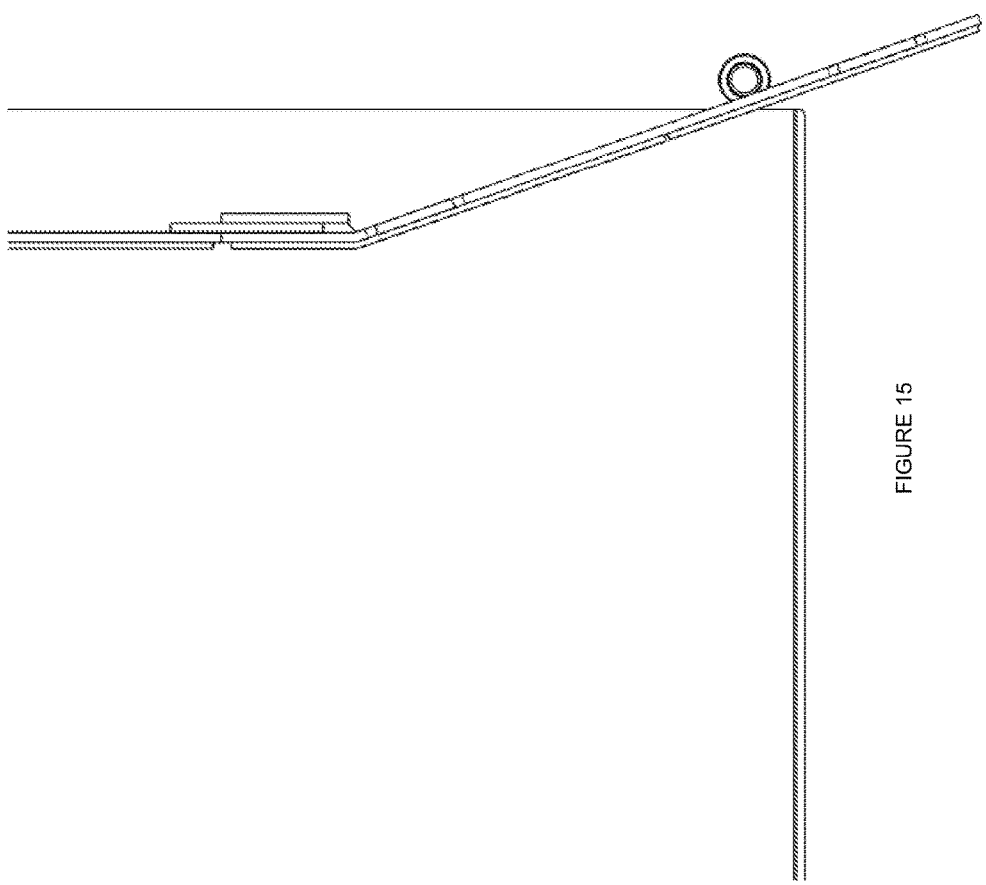
Figure 16:
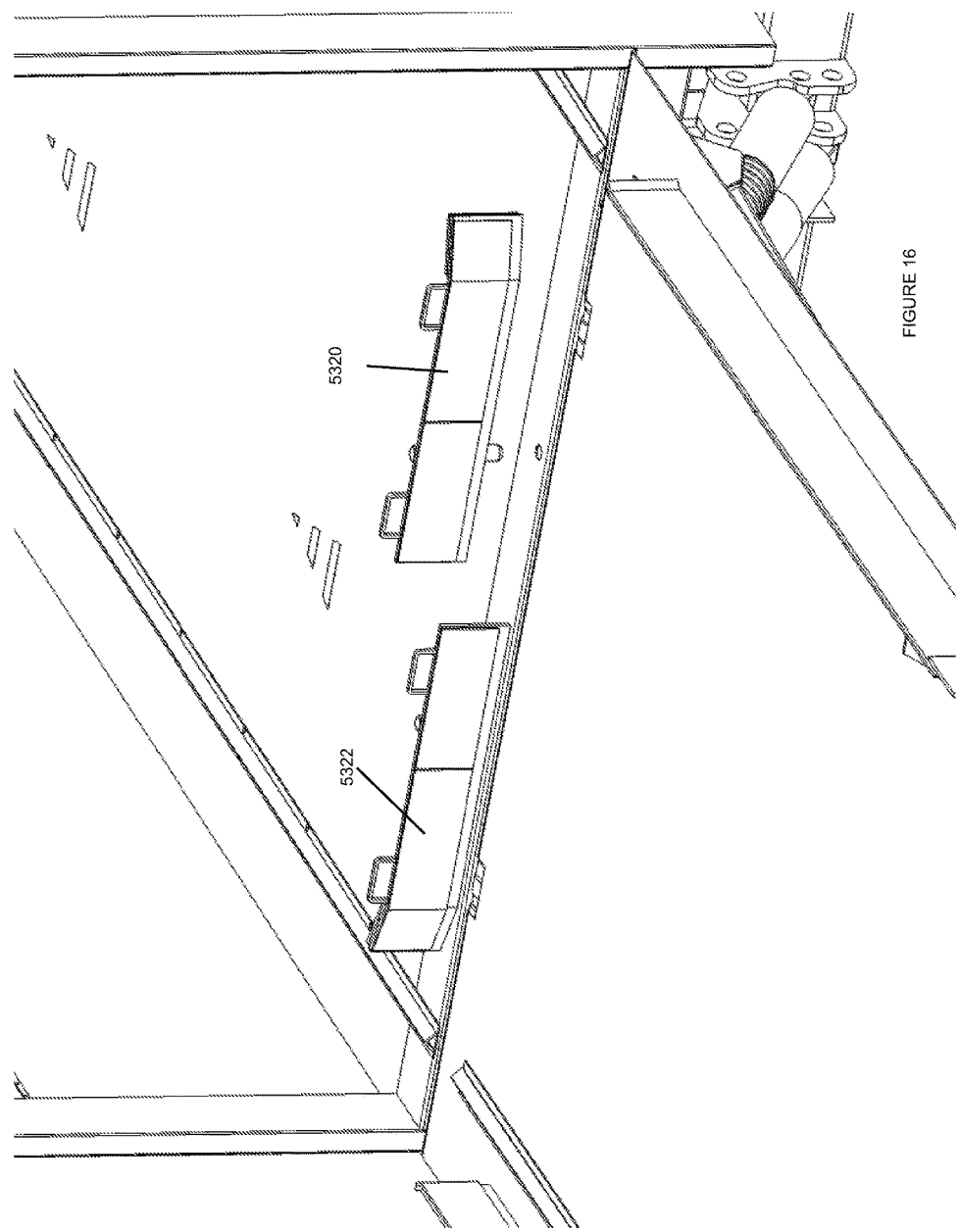
FIG. 16 depicts the storage position of the first removable wing portion (5320) and the second removable wing portion (5322).
Figure 17:
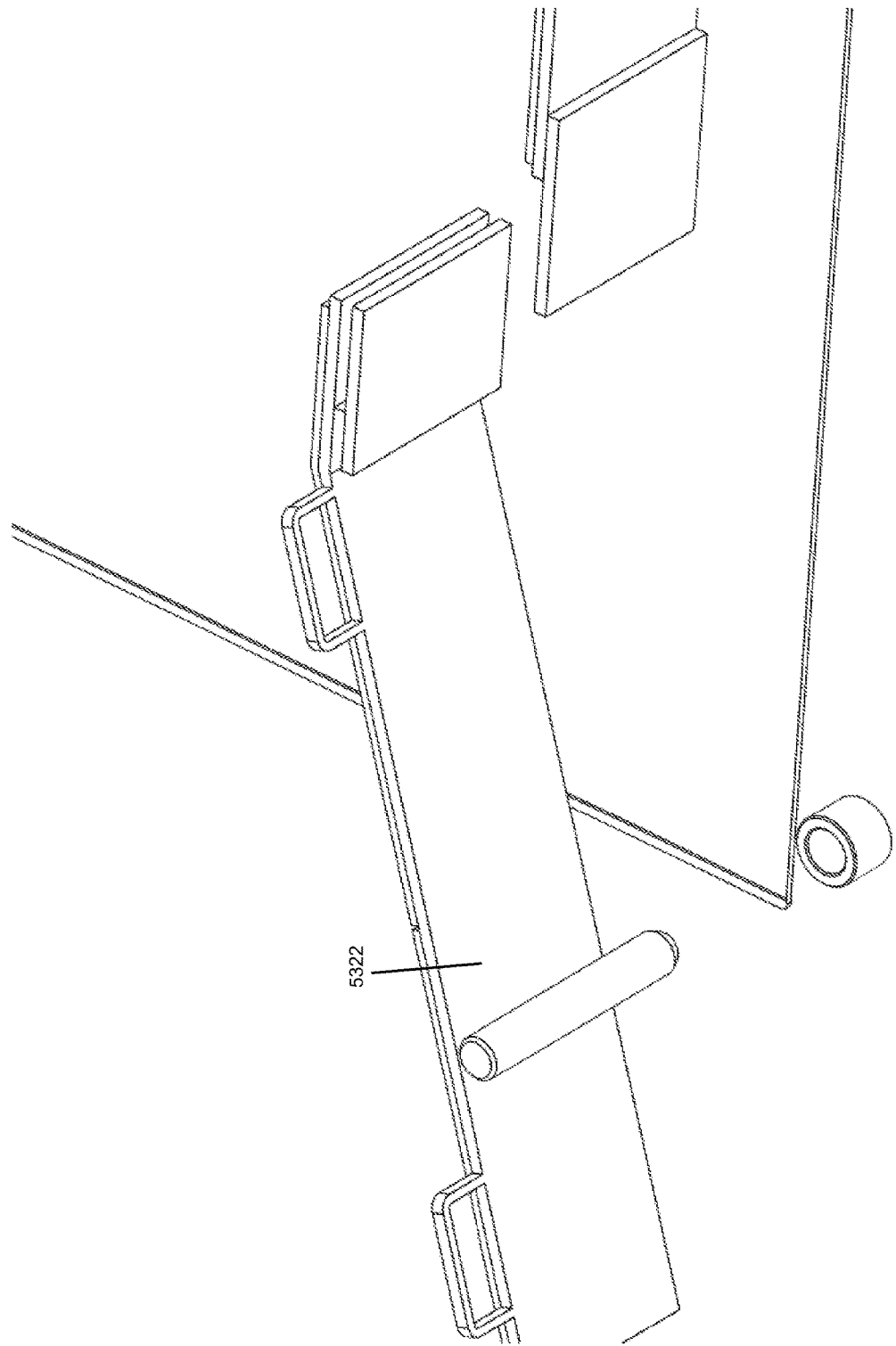
FIG. 17 depicts the liftgate with a second receiving circular portion along the right side and the inner parallel plate and the outer parallel plate.

Another aspect of the present invention provides a stabilizer that may put upward in a stored manner to provide a bumper position (as shown in FIG. 9) and put downward in a stability position (as shown in FIGS. 10 and 11) to provide stability to the liftgate. The stability position also keeps the truck level. There may be a bar (7500) attached to the underside of the shipping container (7502) and a stabilizer (7504) attached to the bar (7500), the stabilizer (7504) having an attachment portion (7700) attached to the bar (7500), a leg portion (7702) attached to the attachment portion (7700), and a level portion (7704) attached to the leg portion (7702). The stabilizer is movably attached to allow for a bumper position and a stability position. The level portion (7704) may be curved and extend above the leg portion and wrap around a bottom of the leg portion.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

I claim:

1. A modular shipping apparatus, comprising:
a shipping container with a bottom interior and having a first track and a second track attached to the bottom interior;
a base having a bottom portion with at least two wheel assemblies, wherein one of each of the at least two wheel assemblies slide along the first track and the second track;
a liftgate having a top portion, bottom portion, left side, right side, top side and bottom side,
wherein the top side has a first liftgate track and a second liftgate track, wherein the first liftgate track and the second liftgate track are aligned with the first track and the second track attached to the bottom interior and the top portion is pivotally attached to the bottom interior of the shipping container,
wherein the top side has a first guide rail and a second guide rail, the first guide rail extends a portion of the length of the left side and having a first removable wing portion removably attached to provide a removed position and a working position and the second guide rail extends a portion of the length of the right side and having a second removable wing portion removably attached to provide a removed position and a working position,
wherein the working position of the first removable wing portion extends to at least the left side of the liftgate,
wherein the working position of the second removable wing portion extends to at least the right side of the liftgate.

2. A modular shipping apparatus as in claim 1, wherein the liftgate has a first receiving circular portion along the left side, wherein the first removable wing portion has an inner parallel plate and an outer parallel plate at a first end and a first circular peg along an outer side and the first circular peg is received in the first receiving circular portion along the left side.

3. A modular shipping apparatus as in claim 2, wherein the first removable wing portion has two open rectangular shaped holds.

4. A modular shipping apparatus as in claim 2, wherein the first guide rail has a rectangular piece along an outer side of the first guide rail towards the bottom portion of the liftgate, to provide the inner parallel plate to align with the first guide rail.

5. A modular shipping apparatus as in claim 2, further comprising a third receiving circular portion in the bottom interior of the shipping container to receive the first circular peg in a storage position that the first removable wing portion is substantially perpendicular to the first track of the shipping container.

6. A modular shipping apparatus as in claim 1, wherein the liftgate has a second receiving circular portion along the right side, wherein the second removable wing portion has an inner parallel plate and an outer parallel plate at a first end and a second circular peg along an outer side and the second circular peg is received in the second receiving circular portion along the right side.

7. A modular shipping apparatus as in claim 6, wherein the second removable wing portion has two open rectangular shaped holds.

8. A modular shipping apparatus as in claim 6, wherein the second guide rail has a rectangular piece along an outer side of the second guide rail towards the bottom portion of the liftgate, to provide the inner parallel plate to align with the second guide rail.

9. A modular shipping apparatus as in claim 6, further comprising a fourth receiving circular portion in the bottom interior of the shipping container to receive the second circular peg in a storage position that the second removable wing portion is substantially perpendicular to the second track of the shipping container.

10. A modular shipping apparatus as in claim 1, further comprising a first stopper attached to first liftgate track.

11. A modular shipping apparatus as in claim 1, further comprising a second stopper attached to the second liftgate track.

12. A modular shipping apparatus as in claim 11, wherein the stabilizer is movably attached to allow for a bumper position and a stability position.

13. A modular shipping apparatus as in claim 11, wherein the level portion is curved and extends above the leg portion and wraps around a bottom of the leg portion.

14. A modular shipping apparats as in claim 1, wherein the at least two wheel assembles are V-groove wheel assemblies.

15. A modular shipping apparats as in claim 1, wherein each of the tracks are V-shaped tracks.

16. A modular shipping apparatus as in claim 1, further comprising a pulley system assembly attached to the bottom interior of the shipping container and the top side of the liftgate to drag the base along the first track and the second track attached to the bottom interior of the shipping container.

17. A modular shipping apparatus as in claim 16, wherein the pulley system assembly is further comprised of a wheel end installed along an underside of the shipping container, a pulley end that is attached to the top side of the lift gate, a strap that is wrapped around the wheel end and the pulley end and attached to a portion of the base to drag the base along the tracks of the shipping container.

18. A modular shipping apparatus as in claim 17, further comprising at least one bracket with a roller attached to a portion of the shipping container, wherein the strap is threaded through the bracket with a pin.

19. A modular shipping apparatus as in claim 1, further comprising a bar attached to the underside of the shipping container and a stabilizer attached to the bar, the stabilizer having an attachment portion attached to the bar, a leg portion attached to the attachment portion, and a level portion attached to the leg portion.

20. A modular shipping apparatus as in claim 1, further comprising at least one friction pad attached to the first guide rail and the second guide rail.

21. A modular shipping apparatus as in claim 1, further comprising a substantially open rectangular portion along the bottom portion of the liftgate.

22. A modular shipping apparatus as in claim 21, wherein the substantially open rectangular portion has four rounded corners.

\* \* \* \* \*